(12) United States Patent
Wen et al.

(10) Patent No.: US 11,146,487 B2
(45) Date of Patent: Oct. 12, 2021

(54) VISUAL REAL-TIME INTERACTION METHOD AND SYSTEM FOR SOFTWARE DEFINED NETWORKING

(71) Applicant: LONGTEL INC., Beijing (CN)

(72) Inventors: Long Wen, Beijing (CN); Wei Zhao, Beijing (CN); Jianhua Feng, Beijing (CN); Jinghui Wang, Beijing (CN); Weihai Zheng, Beijing (CN); Zhuang Ma, Beijing (CN)

(73) Assignee: LONGTEL INC., Beijing (CN)

( * ) Notice: Subject to any disclaimer, the term of this patent is extended or adjusted under 35 U.S.C. 154(b) by 0 days.

(21) Appl. No.: 16/967,914

(22) PCT Filed: Feb. 2, 2019

(86) PCT No.: PCT/CN2019/074586
§ 371 (c)(1),
(2) Date: Aug. 6, 2020

(87) PCT Pub. No.: WO2019/154367
PCT Pub. Date: Aug. 15, 2019

(65) Prior Publication Data
US 2021/0058317 A1    Feb. 25, 2021

(30) Foreign Application Priority Data
Feb. 6, 2018   (CN) .......................... 201810118314.X (51) Int. Cl.
*H04L 12/715*   (2013.01)
*H04L 12/24*    (2006.01)
(Continued)

(52) U.S. Cl.
CPC .............. *H04L 45/64* (2013.01); *H04L 41/12* (2013.01); *H04L 41/18* (2013.01);
(Continued)

(58) Field of Classification Search
CPC ......... H04L 45/64; H04L 41/12; H04L 41/18; H04L 41/5041; H04L 41/5051
See application file for complete search history.

(56) References Cited

U.S. PATENT DOCUMENTS

2008/0049639 A1* 2/2008 Wiley ................. H04L 41/5029
370/252
2012/0327816 A1* 12/2012 Morrill ............ H04M 15/8016
370/259

(Continued)

*Primary Examiner* — Christopher B Robinson
(74) *Attorney, Agent, or Firm* — Armstrong Teasdale LLP (57) ABSTRACT

An embodiment of the present disclosure provides a visual real-time interaction method for software defined networking (SDN). According to this method, a visual interface is established for the SDN. The visual interface includes at least one first node indicative of a port of a switch and at least one second node indicative of a port of a service provider. The first node and the second node are distributed on at least one stack hub. A connection is established between the first node and the second node. The connection has a curvature different from a curvature of the stack hub, and at least an extension line of the connection intersects with the stack hub. A location corresponding to the port of the switch and a location corresponding to the port of the service provider and an attribute of the connection are determined according to the connection.

20 Claims, 7 Drawing Sheets

(51) Int. Cl.
  *H04L 12/26* (2006.01)
  *H04L 12/721* (2013.01)
  *H04L 29/08* (2006.01)

(52) U.S. Cl.
  CPC ...... *H04L 41/5041* (2013.01); *H04L 41/5051* (2013.01); *H04L 43/0876* (2013.01); *H04L 45/38* (2013.01); *H04L 67/141* (2013.01); *H04L 41/22* (2013.01)

(56) References Cited

U.S. PATENT DOCUMENTS

2015/0131997 A1* 5/2015 Syed .................. H04Q 11/0066
  398/69
2017/0070594 A1* 3/2017 Oetting ............... G06F 3/04815

\* cited by examiner

VISUAL REAL-TIME INTERACTION METHOD AND SYSTEM FOR SOFTWARE DEFINED NETWORKING

CROSS REFERENCE TO RELATED APPLICATIONS

This patent application is a National Stage Entry of PCT/CN2019/074,586 filed on Feb. 2, 2019, which claims the benefit and priority of Chinese Patent Application No. 201810118314.X filed on Feb. 6, 2018, the disclosures of which are incorporated herein by reference in their entirety as part of the present application.

BACKGROUND

The present disclosure relates to the field of network communication technologies, and more particularly, to a method, a system, and a computer readable medium for visual real-time interaction for Software Defined Networking (SDN).

In the past, it is needed to request telecom operators to provide services when enterprises need to access to the Internet or private line services. After clarifying the needs of the enterprises and verifying the resources, the telecom operators dispatch engineers to specially configure equipment and register for online services.

In addition, if the enterprises need to change their services (for example, adjust their own network bandwidth) after obtaining the Internet access services, the enterprises need to contact the telecom operators. Therefore, for the management of bandwidth, the enterprises need a large number of manual operations by engineers and configuration of complex network topologies. Adjustment of the services cannot be completed unless it goes through complicated processes. Moreover, the enterprises also need to contact the operators to check the network traffic condition.

BRIEF DESCRIPTION

The present disclosure provides a visual real-time interaction method and system for software defined networking (SDN). According to the method, service conditions between users and service providers can be visually reflected by means of visual interfaces for the SDN, such that the users may self-query and adjust the received services in real time.

A first aspect of the present disclosure provides a visual real-time interaction method for software defined networking. According to this method, a visual interface is established for the software defined networking. The visual interface includes at least one first node indicative of a port of a switch and at least one second node indicative of a port of a service provider. The first node and the second node are distributed on at least one stack hub. A connection is established between the first node and the second node. The connection has a curvature different from a curvature of the stack hub, and at least extends to intersect with the stack hub. A location corresponding to the port of the switch and a location corresponding to the port of the service provider and an attribute of the connection are determined according to the connection.

In some embodiments of the present disclosure, the visual real-time interaction method further includes adding or deleting a first node to the stack hub in real time, and adjusting a spacing of the plurality of first nodes on the stack hub.

In some embodiments of the present disclosure, the visual real-time interaction method further includes setting a first real-time tag for the at least one first node according to an actual situation of the at least one first node. The first real-time tag is indicative of one of a plurality of first states. The plurality of first states include a state to be checked and a normal state.

In some embodiments of the present disclosure, the number of the first nodes is at least two. The visual real-time interaction method further includes establishing a connection between two different first nodes in real time. The connection has a curvature different from a curvature of the stack hub, and at least extends to intersect with the stack hub.

In some embodiments of the present disclosure, the visual real-time interaction method further includes adding or deleting a second node to the stack hub in real time, and adjusting a spacing of the plurality of second nodes on the stack hub.

In some embodiments of the present disclosure, the visual real-time interaction method further includes managing at least one service stack pool. The service stack pool includes a plurality of service stack resources separated from each other. The second node is selected from the service stack pool.

In some embodiments of the present disclosure, the visual real-time interaction method further includes converting the nodes and the connection created by interaction in the at least one stack hub into a script to save the script, and re-establishing the stack hub on the visual interface according to the script.

In some embodiments of the present disclosure, the visual real-time interaction method further includes adjusting the attribute of the connection in real time according to a relationship between the attribute of the connection and time. The attribute of the connection includes any one or a combination of a bandwidth rate, a bit error rate, a delay, and a redundancy.

In some embodiments of the present disclosure, the visual real-time interaction method further includes adjusting the attribute of the connection in real time according to a service quality of the second node. The service quality includes any one or a combination of a delay, a jitter, routing hops, a bandwidth rate, a bit error rate, and a redundancy.

In some embodiments of the present disclosure, the visual real-time interaction method further includes setting at least one scenario template including different service quality needs and bandwidth limitations, and selecting the scenario template according to actual needs of a user, and adjusting attributes of at least one connection according to the scenario template.

In some embodiments of the present disclosure, the visual real-time interaction method further includes determining a billing standard for the service provided in real time according to the first node, the second node, and the connection between the first node and the second node, and billing for the connection in real time according to the billing standard.

In some embodiments of the present disclosure, the visual interface includes a plurality of stack hubs, and each of the stack hubs has at least one first node. The visual real-time interaction method further includes establishing a connection between a first node of a first stack hub and a first node of a second stack hub.

In some embodiments of the present disclosure, the visual interface includes a plurality of stack hubs, and each of the stack hubs has at least one first node and a third node. The visual real-time interaction method further includes establishing a connection between the first node and the third node of the first stack hub, wherein the first stack hub forms a first small stack hub after shrinkage. The first small stack hub is placed on a super stack hub with a detector. A connection is established between the first node and the third node of the second stack hub, and the second stack hub forms a second small stack hub after shrinkage. The second small stack hub is detected by the detector and is distributed onto the super stack hub. A connection is established between the first small stack hub and the second small stack hub on the super stack hub.

A second aspect of the present disclosure provides a visual real-time interaction system for software defined networking (SDN). The system includes a processor and a memory. The memory is coupled to the processor and stores computer program instructions. The computer program instructions are executable by the processor, causing the system to perform the method according to the embodiments of the present disclosure.

A third aspect of the present disclosure provides a computer-readable medium, in which the above computer program is stored. The computer program is executable by the processor to perform the method according to the embodiments of the present disclosure.

BRIEF DESCRIPTION OF THE DRAWINGS

To describe the technical solutions of the present disclosure more clearly, the accompanying drawings of the embodiments will be briefly introduced below. It is to be known that the accompanying drawings in the following description merely relates to some embodiments of the present disclosure, but not limit the present disclosure. In the figures.

DETAILED DESCRIPTION

To make technical solutions and advantages of the embodiments of the present disclosure clearer, the technical solutions in the embodiments of the present disclosure will be described clearly and completely below, in conjunction with the accompanying drawings. Apparently, the described embodiments are merely some but not all of the embodiments of the present disclosure. All other embodiments obtained by those of ordinary skill in the art based on the described embodiments without creative efforts shall fall within the protection scope of the present disclosure.

As used herein, the singular forms "a", "the" and "said" may be intended to include the plural forms as well, unless the context clearly indicates otherwise.

As used herein, the terms "comprising" and "including" specify the presence of the features, integers, steps, operations, elements, and/or components, but do not preclude the presence or addition of one or more other features, integers, steps, operations, elements, components, and/or groups thereof.

Software Defined Networking (SDN) is an implementation manner of network virtualization. By calling the OpenFlow protocol, a control interface for a network device is separated from a data interface. In this way, flexible control of network traffic may be implemented, making the network more intelligent as a pipeline. A visual interface is formed using network topology information, and the visual interface is combined with the SDN network, such that network services can be more conveniently controlled.

Embodiments of the present disclosure provide a stack service implemented based on the SDN network, which may also be referred to as an SDN bandwidth service. The stack service is based on a processed abstractive visual interface, which uses a simple stack hub to represent a complex network, specifically described in detail below.

Figure 1:
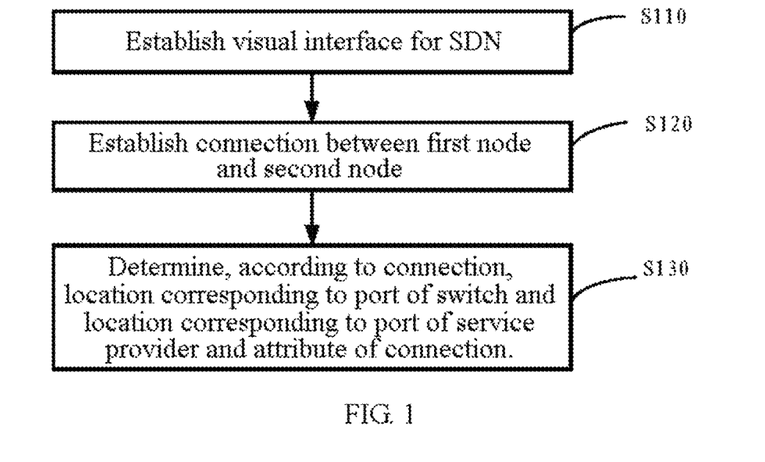
FIG. 1 illustrates a flowchart of a visual real-time interaction method for software defined networking according to an embodiment of the present disclosure.

FIG. 1 illustrates a flowchart of a visual real-time interaction method for software defined networking (SDN) according to an embodiment of the present disclosure.

Figure 2:
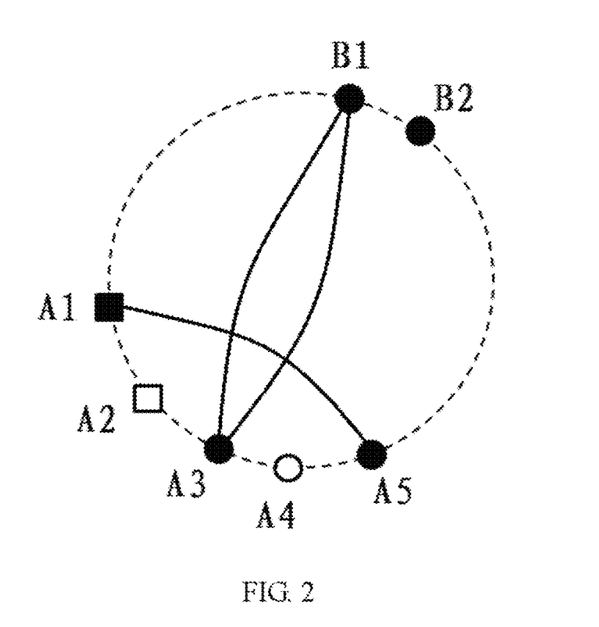
FIG. 2 illustrates a schematic diagram of a visual interface for software defined networking according to an embodiment of the present disclosure.

In Step S110, a visual interface of the SDN is established. FIG. 2 illustrates an example of the visual interface of the SDN.

As shown in FIG. 2, the visual interface includes a circular ring indicated by a dashed line, which is also referred to as a stack hub. A plurality of nodes are distributed on the stack hub, each of the nodes may also be referred to as a stack. The stack is coupled to an SDN controller through an application programming interface (API).

Specifically, the stack may include a plurality of types, such as an enterprise stack (i.e., first node) and a service stack (i.e., second node). The enterprise stack (e.g., A1-A5) represents an enterprise premise, which may schematically indicate a port of a switch for the enterprise premise receiving services. The service stack (e.g., B1 and B2) represents a service provider, which may schematically indicate a port of the service provider, such as a port through which an operator provides services to enterprises.

In some embodiments of the present disclosure, the visual interface of the SDN may be established based on the following method. First, a center point and a radius of the circular ring can be calculated based on a page proportion. Distribution of the respective nodes can be determined based on the type of the nodes. For example, if all nodes belong to the same type, each node can be evenly distributed according to the PI ratio. The calculation formula is, for example, as below: (2*Math·PI/360)*(360/number of nodes). If the plurality of nodes belong to different types, invisible virtual nodes may be adaptively added, such that all the nodes and the virtual nodes can be evenly distributed on the circular ring. The virtual nodes are invisible, thus a user may feel that a gap exists between different types of nodes, as shown in FIG. 2. According to the radian, the coordinates of the center point of the circular ring, and the radius, the coordinates of each node may be calculated based on sine and cosine theorems, and then each node can be generated using the HTML5 canvas API. In addition, the nodes may also be distributed on the circular ring in other ways.

After the stack hubs and the stacks are generated, the state of each stack may be further indicated through different marking manners according to the actual condition of the stack. For example, the state of the enterprise stack may be visually identified in real time based on different colors, shapes, fills, and the like. Specifically, as the establishment of the stack services requires processes of verification and implementation, stand-by stacks and available stacks may be differentiated according to the progress in establishment of the service process. For example, as shown in FIG. 2, an unfilled node represents a stand-by stack in the verification state which is applying a service and cannot yet formally receive the service. A solid node represents an available stack, which has been approved to receive a service provided by the service provider and is in a normal service state. The enterprise stack may be differentiated by different shapes based on the number of the received services. For example, a square node may represent a single-pass stack, and a circular node may represent a multi-pass stack. Only one bridge can be established between the single-pass stacks. That is, only one type of service can be provided between the single-pass stacks. On the other hand, a plurality of bridges can be established between the multi-pass stacks. That is, a plurality of types of services may be provided between the multi-pass stacks. In addition, other states of the enterprise stacks may also be distinguished by different colors, such as the type of the received service, and the like. Similarly, the service stacks may also be identified in real time to indicate types, names, and the like, of the services provided by the service providers.

Figure 3:
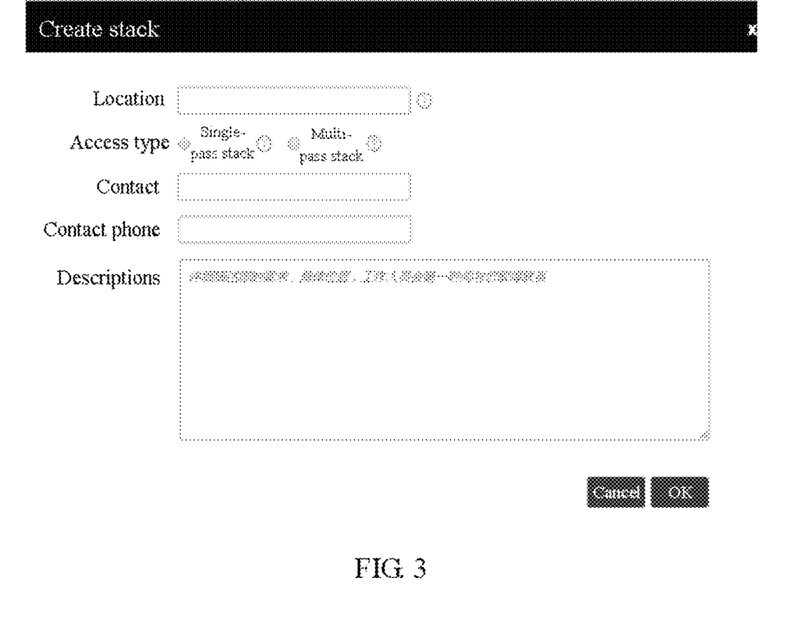
FIG. 3 illustrates a schematic diagram of an interface for creating a stack according to an embodiment of the present disclosure.

In an embodiment, one or more stacks may be added or deleted on the stack hub in real time. FIG. 3 schematically illustrates a schematic diagram of an interface for creating a stack. A new enterprise stack may be created based on a location, an access type or the like of the enterprise stack. Moreover, a certain enterprise stack may be selected from the visual interface and then the certain enterprise may be deleted. Similarly, a service stack may also be added or deleted from the stack hub. Further, in response that the number of the nodes (the enterprise stacks and/or the service stacks) on the stack hub changes, a pattern of the visual interface may be automatically refreshed to adaptively adjust the spacing between the nodes on the stack hub.

After the visual interface is established, the process continues at Step S120, to establish a connection between the respective nodes, thereby indicating that communication can be established between the stacks. It is to be understood that the states and number of nodes may also be updated in real time after the connection is established.

As shown in FIG. 2, the connection between two stacks on the stack hub may be indicated with a bridge, represented by an arc. It can be understood that the bridge may also be represented by other shapes of line. The bridge represents a channel for implementing the communication, for example, a flow established for the enterprise user (the flow saved by the SDN switch). In the visual interface, a connecting (also referred to as ON) state and a disconnecting (also referred to as OFF) state of the service may be represented in real time by establishing and terminating the bridge, such that the bridge may be understood as a switch for connecting or disconnecting the service. A plurality of bridges may also be established between two stacks to represent different services. In addition, the bridge may be associated with the billing function to perform real-time billing. The billing function will be described in detail hereinafter.

According to the type of the stack connected and the connection manner thereof, the bridge may include a service bridge, an inner bridge (or enterprise bridge), and a cross bridge. Each type of bridge will be respectively described in detail below.

The service bridge represents a flow (transmission channel) between an enterprise stack and a service stack for which a service relationship has been established. The service bridge may be established according to the type and the name of a service that can be provided by a service provider. Referring to FIG. 2, the service stack B1 and the enterprise stack A3 are connected through two service bridges, indicating that the service stack B1 provides two types of services for the enterprise stack A3.

The inner bridge represents an internal network transmission channel established between two enterprise stacks in normal service states. For example, a private line service between two offices of a same enterprise may be provided through the inner bridge. As shown in FIG. 2, the enterprise stacks A1 and A5 are connected through an inner bridge.

In addition, the cross bridge represents a dedicated channel established between different stack hubs when the visual interface of the SDN network includes a plurality of stack hubs. For example, a connection may be established between different enterprise stack hubs for different enterprise accounts in a platform.

Figure 4:
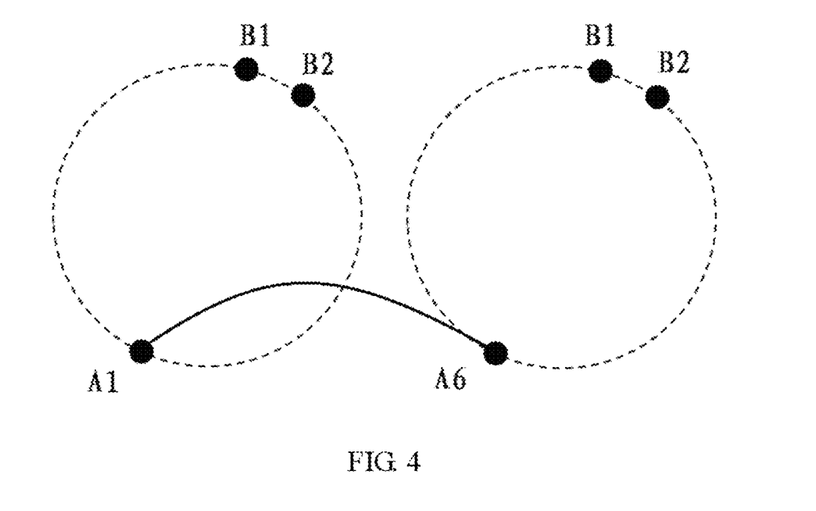
FIG. 4 illustrates a schematic diagram of a visual interface in which a plurality of stack hubs are connected, according to an embodiment of the present disclosure.

FIG. 4 illustrates a schematic diagram of a visual interface in which a plurality of stack hubs are connected, according to an embodiment of the present disclosure. As shown in FIG. 4, the visual interface includes two stack hubs (a first stack hub and a second stack hub). The enterprise stack A1 on the first stack hub and the enterprise stack A6 on the second stack hub are connected in real time through the cross bridge, such that a communication channel between the corresponding enterprise stacks on the different stack hubs can be implemented.

Figure 5:
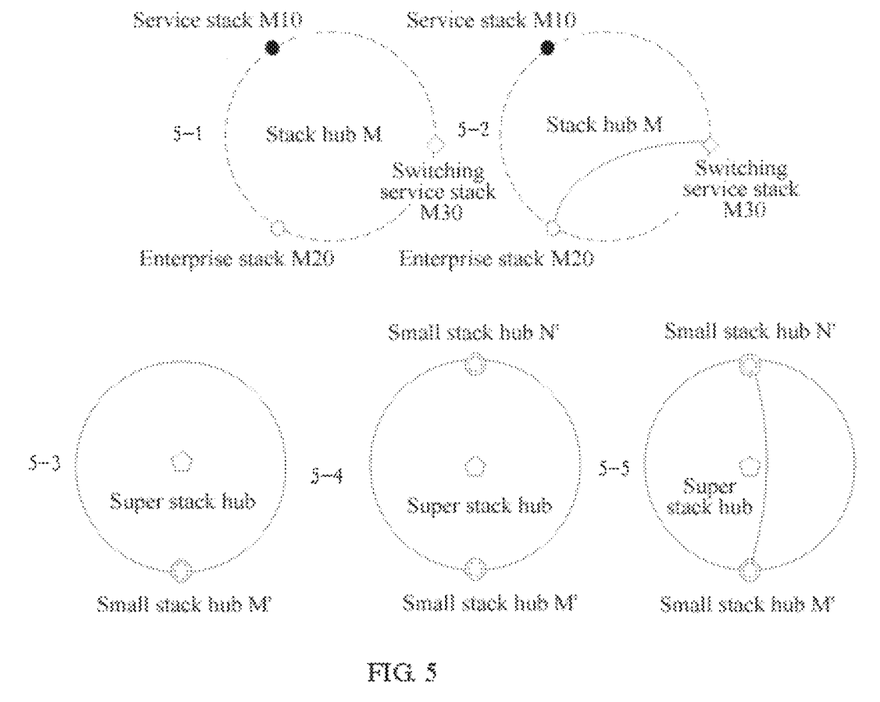
FIG. 5 illustrates a schematic diagram of a visual interface in which a plurality of stack hubs are connected, according to another embodiment of the present disclosure.

In another embodiment, a real-time connection between different stack hubs may also be implemented using diversion service stacks on the stack hubs. FIG. 5 illustrates a schematic diagram of a visual interface in which a plurality of stack hubs are connected according to another embodiment of the present disclosure. In 5-1, in addition to the service stack M10 and the enterprise stack M20, a diversion service stack M30 (represented by a diamond node, also referred to as a third node) is also provided on the first stack hub M. In 5-2, the enterprise stack M20 is connected to the diversion service stack M30 through the inner bridge. The diversion service stack may control the stack hub to shrink, such that, the first stack hub M is shrunk into a first small stack hub M', for example. As shown in 5-3, a super stack hub represented by a solid circular ring is presented, and the first small stack hub M' is arranged on the super stack hub. In addition, the super stack hub is also provided with a detector, which may be represented, for example, by a pentagon in the middle of the super stack hub. The detector may receive a first searching command, and when a second small stack hub N' is found, the second small stack hub N' can also be arranged on the super stack hub, as shown in 5-4. Then, in 5-5, a cross bridge may be established between the small stack hub M' and the small stack hub N' to enable the corresponding enterprise stacks to communicate. In an example, the small stack hub can also be set with an existence time period (for example, within 3 minutes) for which the small stack hub is unconnected. If a connection command has not been received yet after the existence time period is expired, the second small stack hub N' may disappear on the super stack hub, such that the searching command needs to be retransmitted to research the second small stack hub N'. In addition, the super stack hub may also include more small stack hubs, such that corresponding cross bridge connections can be implemented.

In some embodiments of the present disclosure, when establishing the service bridge, the inner bridge and the cross bridge, a Bezier curve algorithm may be used for rendering. Before the rendering, the number of "lines" that have already existed between two nodes may be calculated firstly, to perform a corresponding deviation value calculation. Specifically, a bridge may have a curvature different from a curvature of a stack hub, and at least an extension line of the bridge intersects with the stack hub. In addition, the bridge may also be marked by different colors, thicknesses, and broken/solid line, to indicate the type of bridge (for example, the service bridge, the inner bridge or the cross bridge), service types (such as Internet services, dedicated services, high-speed services, or the like), and the rate of bandwidth, and the like.

In some embodiments of the present disclosure, two stacks may be directly selected from the stack hub of the visual interface in real time, and a bridge connection may be established between the two stacks to implement communication. After the bridges are established, a certain bridge may be selected in real time and may then be removed, such that the communication between the two stacks may be terminated as well. In addition, the bridge may also be generated by a bridge creation interface, while information of the bridge may be adjusted or the bridge may be deleted through a bridge management interface. Every time the number of the bridges changes due to establishing or deleting a bridge, the shapes (for example, the radians) of the bridges may be adaptively adjusted, for example, to cause the bridges between the two nodes bilaterally symmetrical.

In another aspect, a user configuration template may also be established. For example, the nodes and the connections created by interaction in at least one stack hub can be converted into a script, such that the script can be saved. Then, the stack hub can be re-established on the visual interface according to the script. Moreover, the stack hubs can be directly created or recovered according to different scripts.

Then, in Step S130, in the visual interface, a location corresponding to the port of the switch, a location corresponding to the port of the service provider, and an attribute of the connection can be respectively determined according to the bridge (i.e., the connection between the nodes) between the stacks. For example, the type of the service between the stacks, the name of the bridge, an access address, a type of the port, a speed of the bandwidth, a price for the bandwidth and the like, may be determined according to the bridge.

From the above descriptions, the bridge between enterprise stack and the service stack can be provided to represent Internet services, dedicated line services, high-speed channel services and the like of enterprises. It is to be appreciated that the SDN visual interface of the embodiments of the present disclosure is not a visual interface for maintenance provided for professional network administrators, but is a self-serviceable visual view for users using the services. The former one specifically reflects the connection of network devices, which is too complicated and thus is not suitable for the users. However, the SDN visual view of the present disclosure abstracts the service provided by the provider, and abstractly presents the service environment for the users with an annular area composed of visual icons such as a stack hub, a stack, or a bridge, and the like. In addition, the bridge can be configured as a switch for turning on or turning off the corresponding service, such that the visual real-time interaction can be implemented.

Figure 6A:
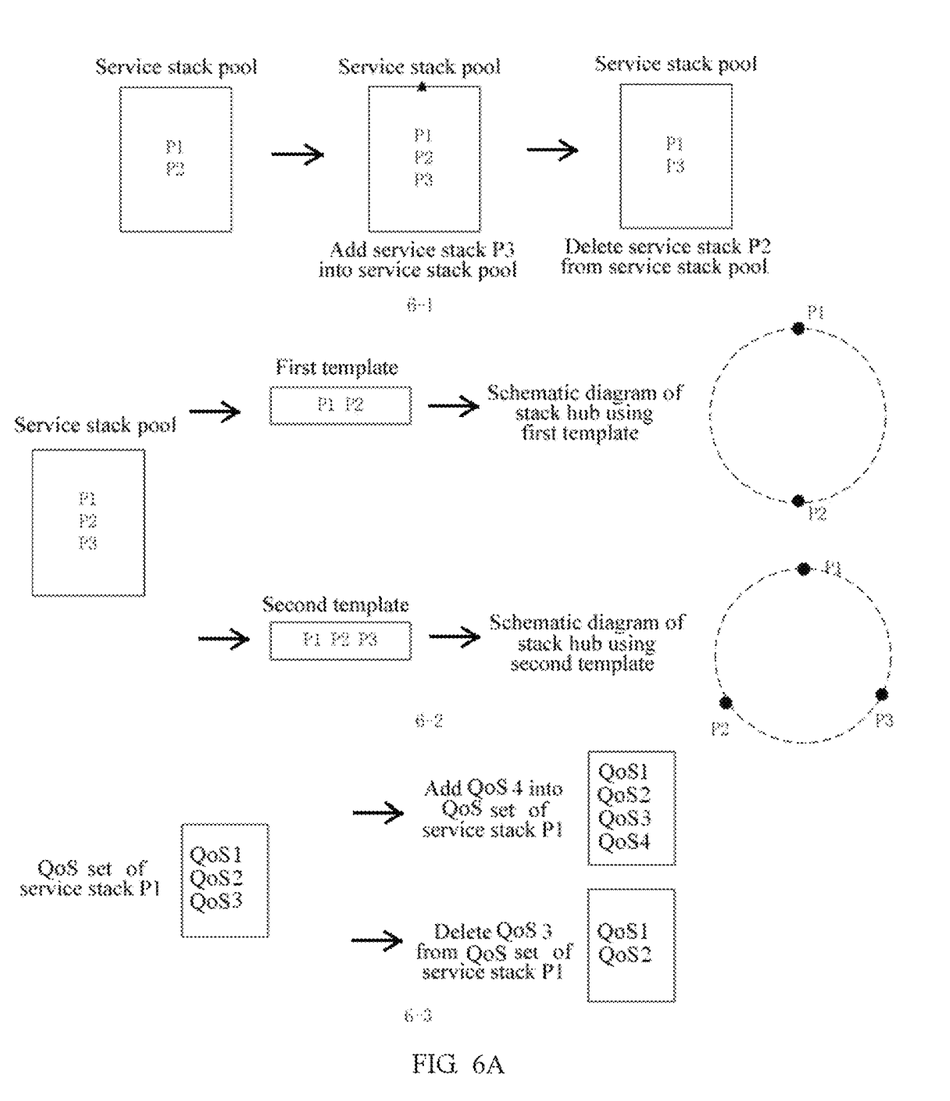
FIG. 6A illustrates a schematic diagram of a service stack pool according to an embodiment of the present disclosure.

FIG. 6A illustrates a schematic diagram of a visual effect of a service stack pool on a front end according to an embodiment of the present disclosure. The service stack pool may include a plurality of service stack resources separated from each other, thus the service stack on the stack hub may be selected from the service stack pool. In addition, the service stack pool may also be managed.

In some embodiments, resources of the service stack on the stack hub may be integrated to form the service stack pool. The service stack pool may provide a management interface for the service stack, such as a first interface, a second interface, a third interface, and a fourth interface.

In some embodiments, addition and deletion of the service stack in the service stack pool can be provided via the first interface of the service stack. As shown in 6-1, the service stack pool includes a service stack P1 and a service stack P2. A service stack P3 may be added via the first interface to the service stack pool, such that the service stack pool includes the service stack P1, the service stack P2, and the service stack P3. Moreover, the service stack P2 may be deleted via the first interface from the service stack pool, such that the service stack pool includes the service stack P2 and the service stack P3. A query for resource usage of the service stack may be provided via the second interface of the service stack. For example, through the second interface, it may be queried which service stacks are used by an enterprise user A, or it may be selected which users use the service stack, or the like. The third interface of the service stack may be provided to allocate resources of the service stack, to set a configuration template of the service stack pool, which can be bound with a plurality of service stacks. Based on the configuration templates of different service stack pools, the service stacks displayed on the stack hub of a user may also be different. As shown in 6-2, the service stack pool includes three service stacks, i.e., the service stack P1, the service stack P2, and the service stack P3. As a first template may be set with the service stack P1 and the service stack P2, the service stacks P1 and P2 can be provided on the stack hub with the first template. Alternatively, a second template may be set with the service stacks P1, P2, and P3 via the third interface, such that the three service stacks P1, P2, and P3 can be configured on the stack hub with the second template. Moreover, a configuration of a set of Quality of Service (QoS) for services in a particular service stack can be provided via the fourth interface. Key indicators of the QoS mainly include availability, throughput, delay, delay variation (including jitter and drift), and lost, or the like. As shown in 6-3, the set of the QoS of the service stack P1 includes QoS1, QoS2, and QoS3. Then, QoS4 may be added to the set of the QoS of the service stack P1 via the fourth interface. Moreover, the QoS3 may be removed from the set of the QoS of the service stack P1 via the fourth interface.

Figure 6B:
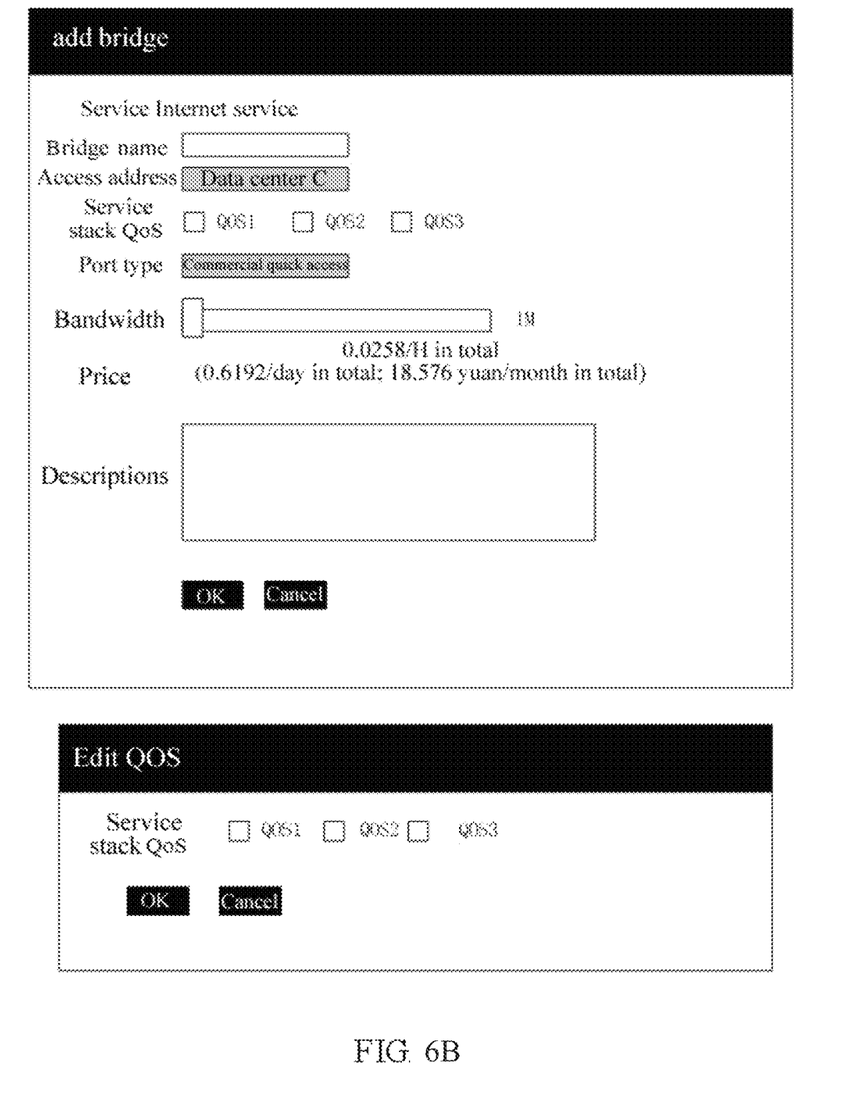
FIG. 6B illustrates a schematic diagram of an interface for creating a stack and editing QOS according to an embodiment of the present disclosure.

FIG. 6B exemplarily illustrates a schematic diagram of an interface for selecting QoS when creating a bridge at the front end, and a schematic diagram of an interface for editing the QoS of the service stack connected to a bridge.

According to some embodiments of the present disclosure, a flow table of the bridge may be updated according to a relationship between attributes of the bridge and time, such that the attributes of the bridge may be adjusted in real time. The attributes of the bridge include any one or a combination of a bandwidth rate, a bit error rate, a delay, and a redundancy. For example, the flow table can be updated to adjust the bandwidth rate of the network service indicated by the bridge, and the like. The method for modifying the attributes of the bridge will be described below.

In an aspect, the bandwidth can be adjusted via an input port for modifying the bandwidth of the bridge provided by a web interface at a front end. First, a bridge to be adjusted can be selected, then the bandwidth size of the bridge can be directly adjusted. A new value of the bandwidth of the bridge may be obtained from the input port, and then the new value can be transmitted to the SDN controller via the API interface according to updated information of the bridge (a flow), such that the flow table can be updated by the SDN controller.

Figure 7:
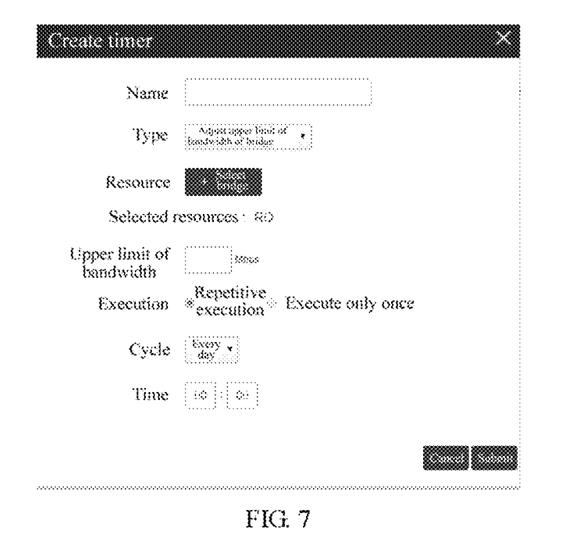
FIG. 7 illustrates a schematic diagram of creating a timer according to an embodiment of the present disclosure.

In another aspect, the bandwidth can be adjusted by setting a timer. FIG. 7 illustrates a schematic diagram of an interface for setting a timer according to an embodiment of the present disclosure. Specifically, a usage of the bandwidth of the bridge can be analyzed. For example, a usage amount of Internet within a particular time may be detected to be large, and the like. An upper limit of the bandwidth rate for the corresponding time period can be set with the timer according to analysis results, such that the bandwidth rate of the bridge can be adjusted for the particular time period. Within the particular time period, the flow table can be updated according to the updated bandwidth information of the selected bridge. For example, by setting two timers, the bandwidth rate within a time period when the amount of Internet use is large (such as a working time period) may be increased, and the bandwidth rate within a time period when the amount of Internet use is small (such as a non-working time period) may be reduced.

Typically, different bandwidth rates of bridges correspond to different basic price. For example, the higher the bandwidth rate is, the higher the basic price would be, and vice versa. Therefore, by adjusting the bandwidth of the bridge, network resources may be allocated more efficiently, and the utilization rate of the network resources may be improved.

In some embodiments of the present disclosure, the attributes of the bridge may also be adjusted according to the QoS of the service stack. For example, an QoS strategy includes a plurality of features, such as route delay, jitter, routing hops, and the like. An optimal route can be determined based on weights configured for each feature and calculation. For example, based on a configuration of the delay weight being 5, the jitter weight being 4 and the routing hops weight being 3, a quality score of a route can be obtained by performing the following calculation: delay score*5+jitter score*4+routing hops score*3. Authorization (quota and funds) and capacity conditions of the enterprise can be checked through a control system of a dispatcher. After conditions are met, a route test can be performed on all the available network resources according to the QoS strategy, and a route conforming to the QoS requirements can be calculated out according to the test results. Then, the attributes of the bridge can be updated according to the calculation results.

In some embodiments of the present disclosure, service strategy template functions are included. The strategy template includes a plurality of attributes such as QoS requirements (delay, jitter, routing hops), bandwidth limitation (upload rate, download rate), and the number of bridges, and the like. The service strategy template may be implemented, for example, in two ways. In the first way, the service strategy template is self-established. This may include two modes: 1) generating the service strategy template by saving the current state of the stack hub, and 2) generating a new strategy template by editing the existing strategy template. The second way is based on machine learning. Strategy templates for different scenarios can be generated through a lot of data training. The service strategy template may be applied to different service scenarios. In an example, a configuration of an existing bridge of an enterprise user may meet daily needs, but in special cases, the configuration of the bridge may hit a plateau. In such cases, the configuration of the bridge needs to be improved to meet new requirements. Therefore, different service strategy templates may be configured for different service scenarios. For example, when a special event occurs, a program may automatically invoke a corresponding strategy to improve the configuration of the bridge. After the special event ends, the program may reset the bridge to the original configuration. Therefore, different strategy templates may be selected according to different scenarios, then the attributes of the bridge may be updated.

In some embodiments of the present disclosure, online real-time billing may also be performed based on the visual real-time interaction method for SDN. For example, billing standards of the provided service may be determined in real time according to the enterprise stack, the service stack and the corresponding bridge, such that the service can be charged in real time according to the billing standards.

Figure 8:
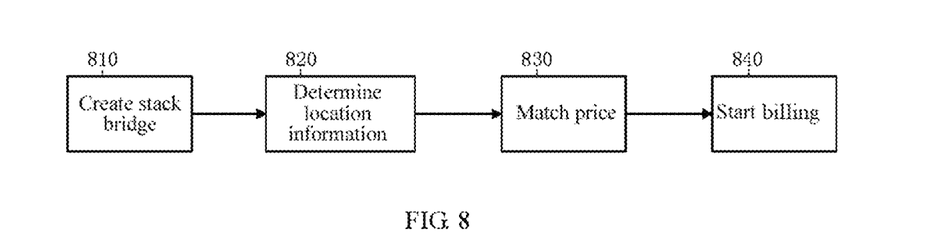
FIG. 8 illustrates a flowchart of an online billing method according to an embodiment of the present disclosure.

FIG. 8 illustrates a flowchart of an online billing method according to an embodiment of the present disclosure. After the bridge is created on the visual interface (810), the SDN switch for the enterprise stack may be determined (820). A location number bound to the switch for the enterprise stack may be obtained according to a unique ID of the SDN switch. Then, a location of the switch may be obtained according to the location number bound to the switch. Based on the location information, the provided service (such as the stack service) and its billing standards may be determined. The obtained billing standards can be matched with the bridge (830). Thus, the bridge may start billing according to the billing standards (840). The billing standards may be related to an object type, a billing unit, the service quality, the basic price, billing strategies and the like with respect to the service.

Figure 9:
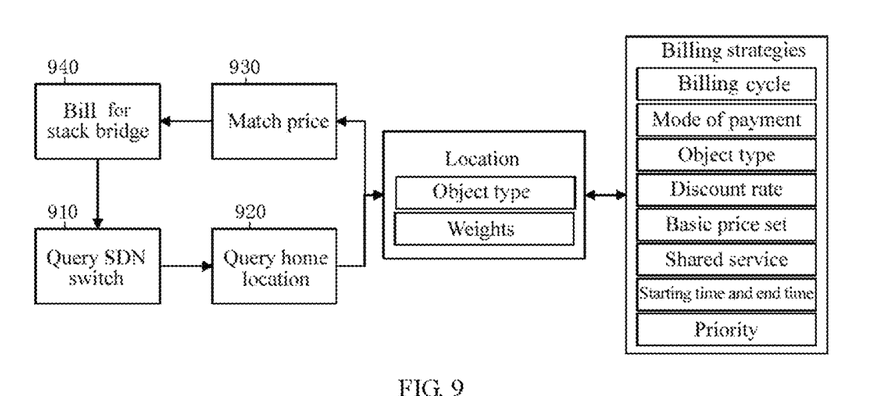
FIG. 9 illustrates a flowchart of an exemplary online billing method according to an embodiment of the present disclosure.

FIG. 9 illustrates a flowchart of an exemplary online billing method according to an embodiment of the present disclosure. In Step 910, an SDN switch, to which the stack belongs, is queried. In Step 920, a location of the SDN switch is queried. In Step 930, a price is determined according to an object type and a weight for the location, and billing strategies (billing cycle, payment manner, object type, discount rate, basic price set, whether to share the service, starting time for establishing the bridge, ending time for terminating the bridge, priority, and the like). Then, in Step 940, billing for the bridge is started. Further, the above steps may be repeatedly performed according to actual conditions.

Specifically, the object type indicates the service provided by the service provider for the enterprise, for example, the stack service (SDN bandwidth) or the like. In addition, the services may also include host services (for example, on CPU, disk or memory). The billing unit may indicate the criteria for service sales, such as the bandwidth rate (M). The Quality of Service (QoS) refers to different levels defined for the same service, wherein the different levels correspond to different price standards. The basic price may indicate a basic price preset for the service. The billing standards may be generated according to the object type, the billing unit and the QoS in combination with the billing time period, predefined billing attributes (such as payment manner (real-time, prepaid, post-paid), discount rate, dedicated services), and the like. In addition, billing strategies of selectable fixed-period billing or real-time billing may be provided for the users.

Figure 10:
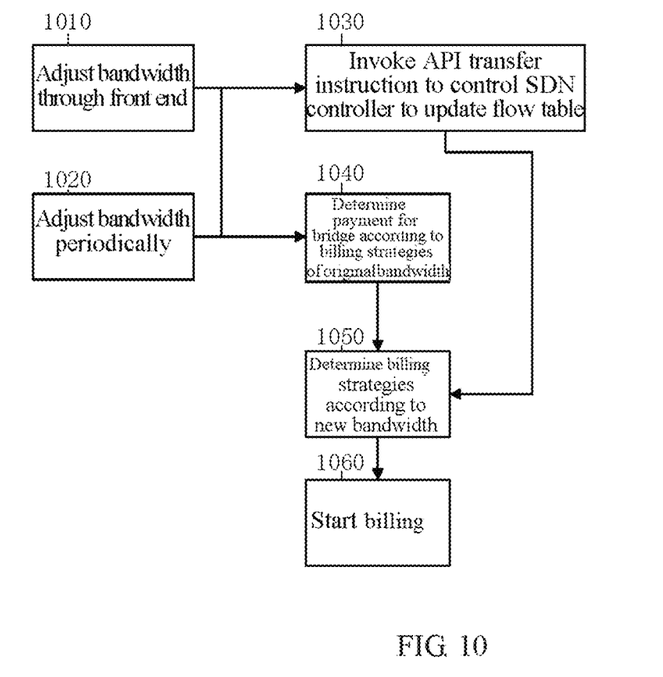
FIG. 10 illustrates a flowchart of another exemplary online billing method according to an embodiment of the present disclosure.

FIG. 10 illustrates a flowchart of another exemplary online billing method according to an embodiment of the present disclosure. Specifically, in Step 1010, the bandwidth is adjusted through the front end. Alternatively, in Step 1020, the bandwidth may be adjusted periodically with a timer. In Step 1030, an API transfer instruction is invoked to control the SDN controller to update the flow table. Once the network bandwidth rate is adjusted, the program may be triggered to update the billing standards of the bridge. Therefore, in Step 1040, a payment is calculated based on the billing strategies of the original bandwidth. Moreover, in Step 1050, updated billing standards are redetermined according to the updated bandwidth. In Step 1060, the billing is started, such that the real-time billing function is implemented.

Figure 11:
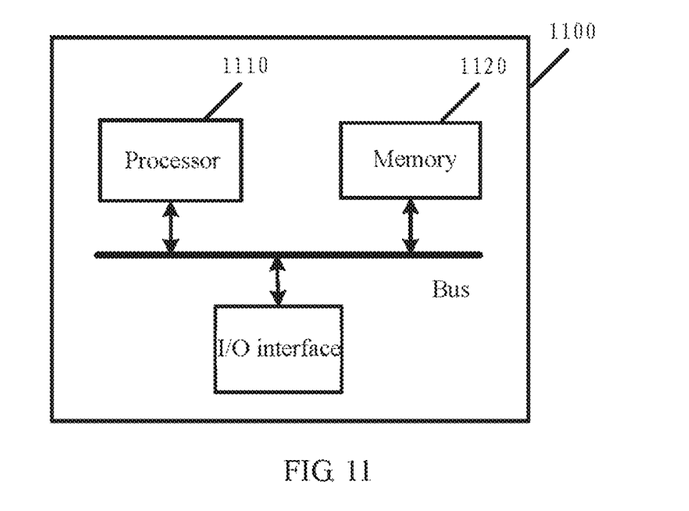
FIG. 11 illustrates a schematic block diagram of a visual real-time interaction system for software defined networking according to an embodiment of the present disclosure.

FIG. 11 illustrates a schematic block diagram of a visual real-time interaction system 1100 for SDN according to an embodiment of the present disclosure. The system 1100 includes a processor 1110 and a memory 1120. The memory is coupled to the processor through a bus, and stores computer program instructions. When being executed by the processor, the computer program instructions cause the system to establish a visual interface for the SDN. The visual interface includes at least one first node indicative of a port of a switch and at least one second node indicative of a port of a service provider, wherein the first node and the second node are distributed on at least one stack hub. A connection is established between the first node and the second node. The connection has a curvature different from a curvature of the stack hub, and at least extends to intersect with the stack hub. A location corresponding to the port of the switch, a location corresponding to the port of the service provider and an attribute of the connection are determined according to the connection. The visual real-time interaction system 1100 may implement the visual real-time interaction method for SDN in the embodiments of the present disclosure.

A plurality of embodiments of the present disclosure are described in detail above. However, the scope of protection of the present disclosure is not limited thereto. Apparently, those ordinary skills in the art may make various modifications, substitutions, and variations on some embodiments of the present disclosure without departing from the spirit and scope of the present disclosure. The scope of protection of the present disclosure is limited by the appended claims.

What is claimed is:

1. A visual real-time interaction method for software defined networking, the method comprising:
    establishing a visual interface for the software defined networking, the visual interface comprising at least one first node indicative of a port of a switch and at least one second node indicative of a port of a service provider, wherein the first node and the second node are distributed on at least one stack hub;
    establishing a connection between the first node and the second node to connect a service in real time, wherein the service is disconnected when the connection is terminated, the connection having a curvature different from a curvature of the stack hub and at least extending to intersect with the stack hub;
    determining, according to the connection, a location corresponding to the port of the switch and a location corresponding to the port of the service provider and an attribute of the connection,
    wherein the attribute of the connection comprises any one or a combination of a bandwidth rate, a bit error rate, a delay, and a redundancy; and
    adjusting the attribute of the connection in real time according to a relationship between the attribute of the connection and time.

2. The visual real-time interaction method according to claim 1, further comprising:
    adding or deleting the first node to the stack hub in real time; and
    adjusting a spacing among the plurality of first nodes on the stack hub.

3. The visual real-time interaction method according to claim 2, further comprising:
    setting a first real-time tag for the at least one first node according to an actual situation of the at least one first node, the first real-time tag indicative of one of a plurality of first states, and the plurality of first states comprising a stand-by state and a normal state.

4. The visual real-time interaction method according to claim 1, wherein the number of the first nodes is at least two, and wherein the method further comprises:
    establishing a connection between two different first nodes in real time, the connection having a curvature different from a curvature of the stack hub and at least an extension line of the connection intersecting with the stack hub.

5. The visual real-time interaction method according to claim 1, further comprising:
    adding or deleting the second node to the stack hub in real time; and
    adjusting a spacing among the plurality of second nodes on the stack hub.

6. The visual real-time interaction method according to claim 1, further comprising:
    managing at least one service stack pool comprising a plurality of service stack resources separated from each other, the second node selected from the service stack pool.

7. The visual real-time interaction method according to claim 1, further comprising:
    converting the first node, the second node, and the connection created by interaction in the at least one stack hub into a script to save the script; and
    re-establishing the stack hub on the visual interface according to the script.

8. The visual real-time interaction method according to claim 1, further comprising:
    adjusting the attribute of the connection in real time according to a service quality of the second node,
    wherein the service quality comprises any one or a combination of a delay, a jitter, routing hops, a bandwidth rate, a bit error rate, and a redundancy.

9. The visual real-time interaction method according to claim 1, further comprising:
  setting at least one scenario template comprising different service quality needs and bandwidth limitations; and
  selecting the scenario template according to actual demands of a user, and adjusting attributes of at least one connection according to the scenario template.

10. The visual real-time interaction method according to claim 1, further comprising:
  determining a billing standard for the service provided in real time according to the first node, the second node, and the connection between the first node and the second node; and
  billing for the connection in real time according to the billing standard.

11. The visual real-time interaction method according to claim 1, wherein the visual interface comprises a plurality of stack hubs, wherein each of the stack hubs has at least one first node, and wherein the method further comprises:
  establishing a connection between a first node of a first stack hub and a first node of a second stack hub.

12. The visual real-time interaction method according to claim 1, wherein the visual interface comprises a plurality of stack hubs, wherein each of the stack hubs has at least one first node and a third node, and wherein the method further comprises:
  establishing a connection between a first node and the third node of the first stack hub, the first stack hub forming a first small stack hub after shrinkage;
  placing the first small stack hub on a super stack hub with a detector;
  establishing a connection between a first node and the third node of the second stack hub, the second stack hub forming a second small stack hub after shrinkage;
  detecting the second small stack hub by the detector and distributing the second small stack hub onto the super stack hub; and
  establishing a connection between the first small stack hub and the second small stack hub on the super stack hub.

13. A visual real-time interaction system for software defined networking comprising:
  a processor; and
  a memory coupled to the processor a storing computer program instructions;
  wherein the computer program instructions are executable by the processor, causing the system to perform the method according to claim 1.

14. A computer-readable storage medium, storing a computer program, wherein the computer program is executable by the processor to perform the method according to claim 1.

15. The visual real-time interaction system according to claim 13, wherein the number of the first nodes is at least two, and wherein the computer program is further executable by the processor to perform:
  establishing a connection between two different first nodes in real time, the connection having a curvature different from a curvature of the stack hub and at least an extension line of the connection intersecting with the stack hub.

16. The visual real-time interaction system according to claim 13, wherein the computer program is further executable by the processor to perform:
  managing at least one service stack pool comprising a plurality of service stack resources separated from each other, the second node selected from the service stack pool.

17. The visual real-time interaction system according to claim 13, wherein the computer program is further executable by the processor to perform:
  adjusting the attribute of the connection in real time according to a service quality of the second node;
  wherein the service quality comprises any one or a combination of a delay, a jitter, routing hops, a bandwidth rate, a bit error rate, and a redundancy.

18. The visual real-time interaction system according to claim 13, wherein the computer program is further executable by the processor to perform:
  determining a billing standard for the service provided in real time according to the first node, the second node, and the connection between the first node and the second node; and
  billing for the connection in real time according to the billing standard.

19. The visual real-time interaction system according to claim 13, wherein the visual interface comprises a plurality of stack hubs, wherein each of the stack hubs has at least one first node, and wherein the computer program is further executable by the processor to perform:
  establishing a connection between a first node of a first stack hub and a first node of a second stack hub.

20. The visual real-time interaction system according to claim 13, wherein the visual interface comprises a plurality of stack hubs, wherein each of the stack hubs has at least one first node and a third node, and wherein the computer program is further executable by the processor to perform:
  establishing a connection between a first node and the third node of the first stack hub, the first stack hub forming a first small stack hub after shrinkage;
  placing the first small stack hub on a super stack hub with a detector;
  establishing a connection between a first node and the third node of the second stack hub, the second stack hub forming a second small stack hub after shrinkage;
  detecting the second small stack hub by the detector and distributing the second small stack hub onto the super stack hub; and
  establishing a connection between the first small stack hub and the second small stack hub on the super stack hub.

* * * * *